US012722992B2

(12) United States Patent
Cabeza Martinez et al.

(10) Patent No.: US 12,722,992 B2
(45) Date of Patent: Sep. 1, 2026

(54) COAGULATING AGENT OF PLANT ORIGIN FOR WATER TREATMENT

(71) Applicant: SERVIECOLOGÍA Y TRATAMIENTO DE AGUAS, S.L., Castellón (ES)

(72) Inventors: José Francisco Cabeza Martinez, Castellón (ES); Diego Forner Mateo, Castellón (ES)

(73) Assignee: SERVIECOLOGÍA Y TRATAMIENTO DE AGUAS, S.L., Castellón (ES)

( * ) Notice: Subject to any disclaimer, the term of this patent is extended or adjusted under 35 U.S.C. 154(b) by 512 days.

(21) Appl. No.: 18/039,136

(22) PCT Filed: Dec. 17, 2021

(86) PCT No.: PCT/EP2021/086397
§ 371 (c)(1),
(2) Date: May 26, 2023

(87) PCT Pub. No.: WO2022/129471
PCT Pub. Date: Jun. 23, 2022

(65) Prior Publication Data

US 2023/0416123 A1 Dec. 28, 2023

(30) Foreign Application Priority Data

Dec. 17, 2020 (EP) .................................... 20383107

(51) Int. Cl.

| | |
|---|---|
| ***C02F 1/54*** | (2023.01) |
| ***C02F 1/52*** | (2023.01) |
| *C02F 101/32* | (2006.01) |
| *C02F 103/30* | (2006.01) |
| *C02F 103/32* | (2006.01) |
| *C02F 103/34* | (2006.01) |
| *C02F 103/36* | (2006.01) |

(52) U.S. Cl.
CPC .............. *C02F 1/54* (2013.01); *C02F 1/5263* (2013.01); *C02F 1/5272* (2013.01); *C02F 2101/32* (2013.01); *C02F 2103/30* (2013.01); *C02F 2103/32* (2013.01); *C02F 2103/343* (2013.01); *C02F 2103/365* (2013.01)

(58) Field of Classification Search
CPC ........ C02F 1/54; C02F 1/5263; C02F 1/6272; C02F 2101/32; C02F 2103/30; C02F 2103/32; C02F 2103/343; C02F 2103/365; C02F 2103/327
See application file for complete search history.

(56) References Cited

U.S. PATENT DOCUMENTS

| | | | | |
|---|---|---|---|---|
| 4,558,080 | A | 12/1985 | Quamme et al. | |
| 5,659,002 | A | 8/1997 | Reed et al. | |
| 6,478,986 | B1 | 11/2002 | Lamb et al. | |
| 2017/0120172 | A1 * | 5/2017 | Moe | B01D 29/684 |

FOREIGN PATENT DOCUMENTS

| | | | |
|---|---|---|---|
| BR | PI0500471 | A | 9/2006 |
| WO | 2014209318 | A1 | 12/2014 |

OTHER PUBLICATIONS

Antonio Pizzi, "Condensed tannins for adhesives", American Chemical Society, Industrial & Engineering Chemistry Product Research and Development, 1982, vol. 21, Issue 3, pp. 359-369, 11 pages.
"Standard Test Method for Determination of Free Formaldehyde in Emulsion Polymers by Liquid Chromatography", ASTM International, Annual Book of ASTM Standards, 2022, vol. 14, Issue 1, 6 pages.
"Standard Methods for the examination of water and wastewater" 21st Edition, 2005, 3111B, 3 pages.
EPA, U.S. Environmental Protection Agency, 1998, "Method 1667, Revision A: Formaldehyde, Isobutyraldehyde, and Furfural by Derivatization Followed by High Performance Liquid Chromatography", 22 pages.

* cited by examiner

*Primary Examiner* — Benjamin L Lebron
(74) *Attorney, Agent, or Firm* — Hayes Soloway P.C.

(57) ABSTRACT

A process for obtaining a coagulant of natural origin based on tannins from the polymerization of *Acacia mearnsii* extract, monoethanolamine, and formaldehyde is characterized by its metal-free properties and an active material content of 28 to 32% by weight obtained from the polymerisation of an *Acacia mearnsii* extract, an amino compound and an aldehyde. The product obtained is a highly efficient coagulant for the purification of wastewater and drinking water.

9 Claims, No Drawings

COAGULATING AGENT OF PLANT ORIGIN FOR WATER TREATMENT

CROSS-REFERENCE TO RELATED APPLICATIONS AND PRIORITY

This patent application claims priority from PCT Application No. PCT/EP2021/086397 filed Dec. 17, 2021, which claims priority from European Patent Application No. 20383107.8 filed Dec. 17, 2020.

The present invention refers to a new process for obtaining a coagulant of natural origin based on tannins from the polymerization of *Acacia mearnsii* extract, monoethanolamide, and formaldehyde, characterized by being free of metals. The product obtained is a highly efficient coagulant for the purification of wastewater and drinking water.

STATE OF THE ART

Tannins are phenolic compounds that are abundant in plant and fruit extracts and can be subdivided into hydrolysable and condensed, depending on their structure. The hydrolysable tannin extracts are those that in the presence of strong acids when hot, hydrolyse into glucose and ellagic acid or gallic acid. Condensed tannin extracts are a complex mixture of about 70% polyflavonoids. The main flavonoid unit present in acacia tannin, an extract of *mimosa* bark, forms oligomers of two to eleven units by self-condensation in the positions 4 and 6.

These natural tannins can be classified into traditional "hydrolysable" tannins and "condensed tannins", as described by A. Pizzi in "Condensed Tannins for Adhesives", Ind. Ing. Chem. Pinchar. Res. Dev. 1982, 21, 359-369. Extracts from Condensed tannins are those made from the bark of the black acacia tree (or commercial mimosa tannin), from the wood of the quebracho tree, from the bark of the hemlock tree, and from the bark of several species of pines in common use. Condensed tannin extracts, such as wattle and quebracho, are composed of approximately 70% polyphenolic tannins, 20% to 25% non-tannins, mainly simple sugars and polymeric carbohydrates (hydrocolloid gums), the latter constitute 3% to 6% of the extract, and contribute greatly to the viscosity of the extract, while the equilibrium is explained by a low percentage of humidity. Although the exact structure is unknown, it is believed that the polyphenolic pattern mainly in quebracho tannins is represented by flavonoid analogues based on rings of resorcinol A and pyrogallol B.

At present, several processes for obtaining coagulant derivatives from *Acacia mearnsii* have been described. Thus, US patent U.S. Pat. No. 6,478,986B1 refers to a process of manufacture of a quaternary tannate as a coagulant/flocculant agent using pyrocatechin tannin as a raw material. This is an extract of *Acacia mearnsii* bark that acts as a nucleophile in front of an electrophilic system, with reactive products of an aldehyde reacting with amines (Mannich reaction). This flocculant agent is used to treat drinking water and water used in industry, through physical-chemical treatment systems by decantation or flotation. The active matter content of this coagulant/flocculant agent is in the range of 36 to 40%.

The application for U.S. Pat. No. 4,558,080 describes a process for obtaining an aqueous flocculant solution containing a non-gelling tannin-based polymer compound that remains stable over a period of several months, and a solids content of 29-40%.

Finally, application for U.S. Pat. No. 5,659,002 refers to a process for synthesizing alkylated Mannich tannin polymers and the use of these polymers in a process to remove colour contaminants from wastewater.

Despite describing coagulating agents, none of these inventions describe a process at an industrial level and, on the other hand, present important limitations such as:

- Their residual formaldehyde content is between 0.3 and 0.8 wt. %, which makes them a dangerous product and represents a significant risk for people during handling, limiting their application and increasing the costs associated with transport and waste management.
- Reduced coagulation efficiency in the treatment of different waste and drinking water.
- Technical limitations during production, quality control, application, and stability.

Finally, in addition to the natural products described in the previous documents, the inorganic salts commonly used as coagulants in physical-chemical treatments of wastewater and drinking water, such as ferric chloride or aluminium polychloride, contribute a large quantity of salts and high concentrations of metals to the treated water and the sludge generated. This increases the costs of management and disposal of sludge and water.

DESCRIPTION OF THE INVENTION

In the present invention, a tannin-based coagulant has been developed that features higher efficiency and stability than similar coagulants manufactured up to now. Compared to other coagulants of the same nature on the market, the product of the invention increases the separation efficiency of particles, both floating and decanted, reducing the dose necessary to work. In addition, it has a minimum lifetime of 12 months, doubling the period of stability of other similar coagulants.

Another point to mention is that the coagulating product of the present invention presents lower residual formaldehyde values than those present in the coagulating agents described to date. It is free of metals such as iron or aluminium in its structure, greatly reducing the contribution of salts and conductivity to the treated water and the resulting sludge, in contrast to inorganic coagulants.

To prepare the coagulating product of the invention, *Acacia mearnsii* extract (tannins) are subjected to Mannich aminomethylation by reaction with an aldehyde (formaldehyde) and an amine (monoethanolamine). The resulting polymer has a higher molecular weight due to the cross-linking of formaldehyde and Mannich base, and, also has an ampholytic character due to the presence of cationic amines and anionic phenols in the polymers. As a result of this ampholytic nature, these polymers are highly soluble in water at extreme pHs.

Therefore, the first aspect of the invention refers to a coagulating agent characterized by being free of metal content and having an active matter content of 28 to 32% by weight obtained from the polymerization of extract of *Acacia mearnsii*, an amino compound and an aldehyde. The addition of *Acacia mearnsii* extract over the dilution of the amino compound in water leads to an *Acacia mearnsii* extract:amino compound weight ratio of between 3:1 and 2.5:1 and where the addition of aldehyde continues until an aldehyde:initial amino compound weight ratio is reached between 1.5:1 and 1:1.

In a preferred embodiment, the coagulating agent is also characterized in that is obtained following the next stages:

(i) dilution of an amino compound in water at a temperature that ranges between 20° C. and 30° C.;

(ii) addition of *Acacia mearnsii* extract until an *Acacia mearnsii* extract:amino compound weight ratio of the amino compound that ranges between 3:1 and 2.5:1;

(iii) heating of the mixture from stage (ii) to a temperature that ranges between 2° and 40° C.

(iv) addition of aldehyde until an aldehyde:initial amino compound weight ratio that ranges between 1.5:1 and 1:1 is achieved;

(v) stirring of the mixture from stage (iv) at a temperature that ranges between 4° and 50° C. for a period of between 30 and 60 minutes;

(vi) adjustment of the pH of the previous mixture to values that ranges between 1.5 and 1.7;

(vii) stirring of the mixture from stage (vi) at a temperature that ranges between 45 and 55° C. for a period of between 50 and 70 minutes, and (viii) cooling of the mixture from stage (vii) to a temperature of 25 to 40° C.

In one method the amino compound is selected from monoethanolamine, methylamine, dimethylamine, and triethylamine, or combinations thereof. In a more preferred method, the amino compound is selected from monoethanolamine, methylamine, and dimethylamine, or combinations thereof. In an even more preferred method, the amino compound is monoethanolamine.

In another method the aldehyde is selected from formaldehyde and acetaldehyde, and in the preferred method the aldehyde is formaldehyde.

The present invention "*Acacia mearnsii* extract", with CAS number 68911-60-4, consists of extracts and their physically modified derivatives such as tinctures, essential oils, oleoresins, terpenes, terpene free fractions, distillates, residues, etc., obtained from *Acacia mearnsii*, Leguminosae.

In the present invention the term "active matter" refers to the total content of solids in the coagulating agent. These solids result from the polymerization of the *Acacia mearnsii* extract with an amino compound and an aldehyde under the conditions indicated above.

The second aspect of the invention concerns a method of obtaining a coagulant characterized by being free of metal content and presenting a content of active matter from 28 to 32%, comprising the following stages:

(i) dilution of an amino compound in water at a temperature of between 20° C. and 30° C.;

(ii) addition of *Acacia mearnsii* extract until an *Acacia mearnsii* extract:amino compound weight ratio of between 3:1 and 2.5:1 is achieved;

(iii) heating of the mixture from stage (ii) to a temperature of 20 to 40° C.;

(iv) addition of aldehyde until an aldehyde:initial amino compound weight ratio of between 1.5:1 and 1:1 is achieved;

(v) stirring of the mixture from stage (iv) at a temperature of between 4° and 50° C. for a period of time between 30 and 60 minutes;

(vi) adjustment of the pH of the above mixture to values between 1.5 and 1.7;

(vii) stirring of the mixture from stage (vi) at a temperature of between 45 to 55° C. for a period of 50 to 70 minutes; and (viii) cooling of the mixture from stage (vii) to a temperature of between 25 and 40° C.

In one method the amino compound is selected from monoethanolamide, methylamine, dimethylamine, and triethylamine, or combinations thereof. In a more preferred method, the amino compound is selected from monoethanolamine, methylamine, and dimethylamine, or combinations thereof. In an even more preferred method, the amino compound is monoethanolamine.

In another method the aldehyde is selected from formaldehyde and acetaldehyde, and in the preferred method, the aldehyde is formaldehyde.

On the other hand, the natural coagulant synthesized in the present invention presents a high effectiveness in the treatment of waste and drinking water through the process of decantation, flotation, and recirculation of the water. Particularly, when the oil and fat content is very high, its efficiency is optimal in flotation systems.

A third aspect of the invention is the use of the coagulating agent as described above for the treatment of wastewater.

In one method, the origin of wastewater can be of urban, agrifood, textile, cardboard, automotive, construction, recycling management, chemical, petrochemical and pharmaceutical.

In another method, the coagulant of the invention is used for the treatment of water with an oil and hydrocarbon content above 1,500 ppm.

The coagulant in this invention presents a liquid state so that it can be applied directly or diluted obtaining optimum results.

The results are visually apparent due to the turbidity values obtained in the transparency of the treated water. This coagulant has a very wide effective working pH range, offering 100% coagulation efficiency between pH values of 4 and 10. In contrast, other traditional coagulants require a thorough pH adjustment, using additional products such as hydrochloric acid and/or sodium hydroxide which makes the treatment process more expensive and brings additional contaminants to the water.

An additional aspect of the invention concerns a method of treating wastewater which involves adding the coagulating agent of the invention to wastewater with a pH between 4 and 10.

In one method, the wastewater can be of urban origin, agrifood, textile, cardboard, automotive, construction, recycling management, chemical, petrochemical and pharmaceutical.

In another method, the wastewater has an oil and hydrocarbon content of over 1,500 ppm.

In a further method, the coagulating agent is added to the agitated wastewater using dosing pumps for application.

In short, the synthesised coagulating agent is highly environmentally friendly, thanks to its high degree of biodegradability and to the fact that inorganic agents are not incorporated as it does not require pH adjustment with inorganic acids or bases. Other additional advantages are:

It presents a greater efficiency compared to other natural or traditional inorganic coagulants.

It does not contribute salts, so the conductivity of the effluent is not increased, favouring the reuse of water.

It is 100% efficient in a range of pH 4-10.

It contains a residual value of formaldehyde lower than those present in the coagulating agents described in the state of the technique, conferring a non-dangerous character to the coagulating agent of the invention.

After adding it to the water it does not modify its pH, it is therefore not necessary to use additional alkalizing products such as sodium or calcium hydroxide.

It reduces the cost of treatment, avoiding the use of soda or lime, reducing or eliminating the use of flocculants, improving the quality of clarification and/or reducing the costs of waste management.

The natural coagulant is safer for people because it is not corrosive nor dangerous to health.

It does not add metals to the water or to the sludge, favouring the value of the sludge for agricultural use.

It is environmentally friendly, as it is composed of natural and sustainable substrates throughout its life cycle.

This product avoids wear and tear on the installation and machinery, resulting in lower maintenance costs.

Its use as a coagulant produces lower volumes of sludge, it is less toxic, and therefore more economical to manage.

Throughout the description and claims the word "comprises" and its variants are not intended to exclude other technical characteristics, additives, components or steps. For experts in the field, other objects, advantages, and characteristics of the invention will be partly derived from the description and partly from the practice of the invention. The following examples are provided by way of illustration and are not intended to be restrictive of the present invention.

EXAMPLES

The invention will be illustrated by means of tests carried out by the creators, which demonstrate the effectiveness of the product.

Example 1. Procedure for Obtaining the Coagulating Agent for the Invention

For the preparation of the coagulating agent for the invention the following stages are carried out:

1. The reactor is loaded with 1,843 Kg of water and heated to 23° C.
2. 325 Kg of ethanolamine (CAS 141-43-5) is slowly dosed, with the automatic dosing equipment and stirring in operation, raising the temperature to 28° C. by means of the reactor heating system.
3. Leave to stir for 40 minutes.
4. 900 kg of *Acacia mearnsii* extract (CAS 68911-60-4) is added, reaching a temperature of 31° C.
5. Leave to stir for 15 minutes, increasing the temperature to 35° C.
6. 425 kg of formaldehyde (CAS 50-00-0) is added slowly, by means of a dosing device, with the reactor tightly sealed. An exothermic reaction occurs, reaching a temperature between 48 and 50° C.
7. This temperature must be maintained for 40 minutes with the stirring system in progress.
8. 585 kg of Hydrochloric acid (CAS 7647-01-0) is then added by means of the dosing device. In this phase the temperature increases to 55-57° C.
9. The temperature is reduced to 50° C. for one hour, cooling the equipment.
10. Reduction in the reaction temperature to approximately 40-42° C.

Example 2. Synthesis of Known Coagulating Agents (U.S. Pat. Nos. 4,558,080A and 5,659,002A)

The following are the manufacturing processes of other coagulants already known in the state of the art and carried out at laboratory level, in order to determine their technical feasibility and real coagulating efficiency from the physical-chemical treatment of problem wastewater samples from various industrial sectors.

A. Production of the Coagulating Agent Described in U.S. Pat. No. 4,558,080A

Place 130.75 g of water and 125.75 g of *Acacia mearnsii* extract into a 2-litre beaker and heat a thermostatically controlled plate to 55° C. while stirring. Once the temperature has been reached, the heating is stopped and 0.15 g of silicone defoamer and 47.67 g of monoethanolamine (MEA) are added. It is then heated to 55° C. and, once this temperature has been reached, 80 g of hydrochloric acid is added, checking that the pH is between 6.4-6.7. If it is higher, add hydrochloric acid drop by drop until this pH is reached. If the pH is lower, MEA is added drop by drop until this pH range is reached. After this, it is heated to 60° C. and 62.7 g of formaldehyde is added slowly, taking care not to exceed 80° C., the point at which the reaction begins. Next, the temperature is maintained at 80° C. and the viscosity is measured while hot until it reaches 38-40 cPs. At this point, 45.20 g of cold water is added to cool and 7.8 g of hydrochloric acid. Finally, it is left to cool to room temperature. The final pH is around 2.4 and the viscosity is approximately 250 cPs once the ambient temperature has been reached.

Theoretically, the final product has a solids content close to 40%. However, the following limitations are detected:

The optimum working temperature is 80° C., which is much higher than the proposal in our procedure. This leads to a very important increase in energy consumption, representing a clear technical disadvantage in the manufacturing process proposed in this patent.

Despite having a higher solids content, the coagulating efficiency of the final product is lower than the efficiency of the product developed by SERVYECO, reducing its technical feasibility during application.

These experimental results are detailed in the following.

B. Production of the Coagulating Agent Described in U.S. Pat. No. 5,659,002A 84.6 g of deionised water and 0.1 g of silicone-based defoamer are added to a one-litre reactor. While stirring rapidly, slowly add 73.4 g of *Acacia mearnsii* extract. The resulting mixture is left to stir for 30 minutes to facilitate the dissolution of the solid. 54.2 g of ethanolamine is then dosed for 15 minutes, so that the reaction temperature does not exceed 40° C. Subsequently, 71.3 g of a 37% aqueous solution of formaldehyde is dosed over 30 minutes, so that the reaction temperature does not exceed 65° C. After stirring for a further 15 minutes, the pH of the reaction is adjusted to 7.5 by slowly and carefully adding hydrochloric acid (approximately 20 g of a 38% aqueous solution). After this, the reaction mixture is heated to 75° C. and stirred for a further 3 hours. The reaction is then maintained until an aliquot of the mixture, adjusted to pH 2-3 with concentrated hydrochloric acid, reaches a viscosity close to 125 centipoises. At this point, the reaction product is diluted with deionised water to 29% total solids.

After following the manufacturing procedures described, the following technical limitations are detected:

The capacity to dissolve the *Acacia mearnsii* extract powder is very limited in water at room temperature, increasing the stirring time described from 30 minutes to more than 60.

The final product (29% total solids) is separated into two clearly distinguishable phases after only 24 hours at room temperature. This makes its application very difficult, as it requires almost constant stirring during dosing in wastewater treatment plants. Furthermore, after only 6 days of storage the product increased its viscosity until it formed a gel, making its application impossible.

The resulting product, before being diluted in water, has a very high viscosity (close to 2,500 centipoises, even at 75° C.), which makes it very difficult to stir and subsequently dilute and package.

The proposed reaction temperature is 75° C. and the reaction time is 3 hours. Both values are much higher than those defined in the obtaining of the coagulating agent of the invention. This leads to an important increase in energy consumption, representing a clear technical disadvantage in the manufacturing process proposed in this patent.

Example 3. Detection of Metal Content

The determination of metals was carried out by means of spectrophotometry using flame atomic absorption of the following metals (metal, dissolved metal and total metal) in inland water and wastewater: Fe, Zn, Cr, Al, Pb, Cu, Co, Mn, Ni and Cd, when they are in concentrations between the limit of quantification defined in the following table and 1,000 mg/l. This analysis procedure is based on the "Standard Methods for the examination of water and wastewater" 21st Edition 2005, 3111 B.

| Element | Limit of quantification (mg/L) |
|---|---|
| Fe | 0.1 |
| Zn | 0.2 |
| Pb | 0.2 |
| Cr | 0.1 |
| Al | 0.5 |
| Ca | 0.2 |
| Mg | 0.1 |
| Cu | 0.2 |
| Co | 0.06 |
| Mn | 0.1 |
| Ni | 0.2 |
| Cd | 0.1 |

The samples are prepared according to the species. In all cases, at the end of the preparation process, a liquid sample free of solids will be available in suspension or turbidity, which will be the sample aliquot to be measured. Once the calibration standards have been measured and the Absorbance ratio has been established-concentration that results in the calibration curve-the suction pipette is introduced into distilled water with approximately 1% nitric for cleaning. Subsequently, the programme will continue to demand samples according to the sample sequence introduced into it. The first sample to be measured will usually be a control followed by the rest of the samples. Both the data relating to the standards and those of the samples is entered into the corresponding method that automatically records and stores absorbance and concentration data. Between each sample the pipette is placed into distilled water with 1% nitric for cleaning.

As a result of the analysis, it can be seen that the new product developed lacks metals in its formulation. This means that the values of metals such as aluminium or iron are below the detection limit. However, despite the fact that the known coagulating agents synthesized in Example 2, which are used in most commercial formulations, rely primarily on coagulants of natural origin of *Acacia meansii* extract, they are also based on inorganic salts that provide large quantities of metals such as aluminium. Therefore, the present values of this metal in these commercial products vary between 300 and 3,000 ppm.

In addition, inorganic salts commonly used as coagulants in physical-chemical treatments of wastewater and drinking water, such as ferric chloride or polyaluminium chloride, contribute large amounts of salts and high concentrations of metals to the treated water and the sludge generated. This increases the costs of management and disposal of sludge and water.

Example 4. Detection of Residual Formaldehyde

The analysis procedure used to detect these residual formaldehyde values in the samples analysed have been based on the standard method ASTM D5910-96 (American Society for Testing and Materials) and in the EPA method (United States Environmental Protection Agency) number 1667, Revision A (Formaldehyde, Isobutyraldehyde, and Furfural by Derivatization Followed by High Performance Liquid Chromatography).

From these, the method used is based on the formation of a derivative with the reactant Dinitrophenylhydrazine (DNPH) and subsequent chromatographic analysis measuring 360 nm for between 60 and 120 minutes after the formation of the derivative. In this way, the previous dilution of the product to be analysed gives rise to the free formaldehyde derivative with DNPH for subsequent testing.

The residual value of formaldehyde in the invention coagulant has been found to be less than 0.1 wt. %, conferring a non-hazardous character to the coagulating agent of the invention. By analysing the value of residual formaldehyde present in the products synthesised in example 2, values between 0.42 and 1.71 wt. % have been obtained. Therefore, unlike the coagulating product of the present invention, these have high residual formaldehyde values, making them dangerous.

Example 5. Comparative Example of Coagulating Efficiency Between Known Coagulating Agents and the Coagulating Agent of the Present Invention With regard to the coagulating nature of the new natural product developed, various Jar Tests have been carried out to compare their efficiency against the natural products of the competition synthesised in Example 2.

In the following table the range of doses required (ppm, grams of coagulant per cubic meter of treated water) and the percentage reduction obtained (%) for an optimal physical-chemical treatment of various products is detailed (comparing the new coagulating agent of the invention with the natural products of the competition synthesized in Example 2) in various types of application and different industrial sectors.

| Application/ Industrial Sector | Dose (ppm) | Dose reduction (%) |
|---|---|---|
| Car Manufacture | 100-75 | 31-25 |
| Oil Refinery | 125-100 | 52-44 |
| Dairy products | 300-270 | 51-42 |
| Cooked foods | 750-700 | 27-22 |
| Chicken Slaughterhouse | 1,000-850 | 38-30 |
| Biodiesel generation | 200-170 | 11-0 |
| Ceramics | 850-700 | 16-8 |
| Oils | 75-60 | 41-36 |

-continued

| Application/ Industrial Sector | Dose (ppm) | Dose reduction (%) |
|---|---|---|
| Foods | 700-550 | 32-23 |
| Ceramic Glazes | 100-70 | 20-16 |
| Urban wastewater | 100-80 | 12-5 |
| Drinking water | 15-10 | 181-11 |

As a result of these coagulation efficiency tests, by carrying out Jar Tests, it has been observed that the product manufactured from document U.S. Pat. No. 5,659,002, apart from being unstable and gelling in a few days, has extremely low coagulating efficiency compared to other standard or natural coagulants.

The product manufactured from document U.S. Pat. No. 4,558,080 has a high active matter content, close to 40%. This means that using similar doses to the coagulating product of the invention (solid content of 28 to 32%), the coagulating efficiency is markedly lower and the treatment cost higher, for the same type of active ingredient.

Example 6. Determination of the Dose Required for a Physical-Chemical Treatment

The following table details the range of the necessary dose (ppm, grams of coagulant per cubic meter of treated water) and the percentage of reduction obtained (%) for optimum physical-chemical treatment of the coagulant product of the invention (28-32% in solids) compared to the product manufactured from document U.S. Pat. No. 4,558,080A (40% in solids) in various types of application and different industrial sectors:

| Application/ Industrial sector | Dose (ppm) | Dose reduction (%) |
|---|---|---|
| Car manufacture | 100-75 | 4-1 |
| Oil Refineries | 125-100 | 8-6 |
| Canneries | 100-70 | 2-0 |
| Dairy products | 320-280 | 12-8 |
| Chicken slaughterhouse | 1,000-850 | 9-5 |
| Urban wastewater | 100-80 | 8-2 |
| Drinking water | 15-10 | 5-0 |

Example 7. Coagulating Agent Activity of the Invention in the Treatment of Industrial Wastewater, Drinking Water and Urban Wastewater To determine the coagulating activity, various tests are carried out on water from different sectors (Jar Test). These are comparative tests consisting of doses of increasing quantities of the coagulating agent of the invention, comparing the turbidity (or other physical-chemical parameters such as phosphorus) of the clarifications generated.

The detailed procedure for a Jar Test is as follows:

A quantity of sample to be tested is added to a beaker, a separate beaker per concentration to be tested.

The beaker(s) is (are) placed in the automatic flocculator.

Stirring is started at 120 rpm and a different amount of the coagulating product of the invention is added to each of the beakers in the form of a scale, for example, in the first beaker 50 ppm, in the second 100 ppm and so on.

Stirring is maintained for 1 minute.

After this time the speed is reduced to 60 rpm and a suitable amount of flocculant is added and left to stir for 2 minutes.

Stirring is stopped and the decanting speed and quality of clarification are observed.

Finally, the turbidity of the clarification obtained in each case is measured.

The main applications have been divided into three groups:

Non-Specific Coagulant for the Treatment of Industrial Wastewater.

The following table details the dose required (ppm or grams of coagulant per cubic metre of treated water) and the final turbidity (NTU) of the clarified product for optimum physical-chemical treatment of the coagulant product of the invention (28-32% in solid) in various types of industrial sectors. The final turbidity is in all cases less than that required for each of the sectors and applications, depending on their use or further treatment:

| Industrial Sector | Dose (ppm) | Turbidity (NTU) |
|---|---|---|
| Car Manufacture | 75-60 | 6.91 |
| Oil Refinery | 90-60 | 13.6 |
| Dairy Products | 190-160 | 18.6 |
| Cooked Foods | 700-660 | 11.3 |
| Slaughterhouse | 900-650 | 11.6 |
| Biodiesel | 180-150 | 18.6 |
| Ceramic | 650-500 | 10 |
| Oils | 60-45 | 14.9 |
| Foods | 500-360 | 32.7 |
| Glazes | 70-55 | 8.6 |

Non-Specific Coagulant for the Treatment of Drinking Water

The following table details the necessary dose (ppm or grams of coagulant per cubic metre of water to be treated) and the final turbidity (NTU) of the clarification for optimum treatment of drinking water using the coagulating product of the invention (28-32% in solids) in three water treatment plants. The final turbidity is in all cases lower than that required for this type of application. The optimum dosage of the coagulating product of the invention (28-32% in solids) for this type of application is between 10 and 15 ppm and the quality of the clarification is below 1.8 NTU.

| Treatment of drinking water | Plant 1 | Plant 2 | Plant 3 |
|---|---|---|---|
| Dose (ppm) | 12 | 9 | 14 |
| Turbidity (NTU) | 1.2 | 1.7 | 1.3 |

Specific Coagulant for the Removal of Total Phosphorus in the Secondary Treatment of Urban Wastewater The following table details the necessary dose (ppm or grams of coagulant per cubic metre of water to be treated) and the final phosphorus concentration (ppm) of three urban wastewater treatment plants. The final phosphorus concentration of the clarified water is well below the concentration required for these types of facilities. The optimal dosage of the coagulating product of the invention (28-32% in solids) is between 75 and 86 ppm and the amount of total phosphorus determined in the clarification in all cases, is below 1 ppm.

| Treatment of urban wastewater | Plant 1 | Plant 2 | Plant 3 |
|---|---|---|---|
| Dose (ppm) | 80 | 75 | 86 |
| Phosphorus (ppm) | 0.8 | 0.6 | 0.9 |

Example 8. Determination of the Sodium Hydroxide Dose Required for pH Adjustment in a Physical-Chemical Treatment Inorganic salts commonly used for coagulation like polyaluminum chloride or ferric chloride form certain ions in solution that are responsible for the coagulation action taking place. However, the actual ions produced by these salts depend upon the pH of the water sample.

At varying sample pH values, the coagulation process may suffer from less than optimum ions being formed in solution. pH that is too low may not allow the coagulation process to proceed, while high pH can cause a coagulated particle to redisperse. The size of the coagulated particles is also affected by pH, which, in turn, determines the density of the flocculated slime and its tendency and rate of settling out. The optimum pH for the coagulation and flocculation process is then accomplished using neutralizing agents like sodium hydroxide or calcium hydroxide.

However, the new natural product developed is not pH dependant, decreasing or even removing the dose of sodium hydroxide during the coagulation process.

The following table details the range of the necessary sodium hydroxide dose (ppm, grams of coagulant per cubic meter of treated water) and the percentage of reduction obtained (%) for optimum physical-chemical treatment of the coagulant product of the invention (28-32% in solids) compared to inorganic salts, like polyaluminum chloride or ferric chloride, in various types of application and different industrial sectors:

| Application/ Industrial Sector | Dose (ppm) | Dose reduction (%) |
|---|---|---|
| Car Manufacture | 100-150 | 74-88 |
| Oil Refinery | 0-20 | 82-100 |
| Dairy products | 150-280 | 78-91 |
| Cooked foods | 50-100 | 82-88 |
| Chicken Slaughterhouse | 0-180 | 92-100 |
| Biodiesel generation | 0-180 | 85-100 |
| Ceramics | 0-50 | 83-100 |
| Oils | 0-100 | 95-100 |
| Foods | 50-75 | 75-85 |
| Ceramic Glazes | 0-25 | 90-100 |

Example 9. Comparative Example of Flocculant Dose Between Standard Coagulants (Inorganic Salts) and the Coagulating Agent of the Present Invention With regard to the coagulating nature of the new natural product developed, various industrial trials have been carried out to experimentally determine the flocculant dose requested when using inorganic coagulants like polyaluminum chloride or ferric chloride against the new coagulating agent of the invention.

In the following table the range of flocculant dose requested (ppm, grams of coagulant per cubic meter of treated water) and the percentage reduction obtained (%) for an optimal physical-chemical treatment of various products is detailed (comparing the new coagulating agent of the invention with standard inorganic coagulants, like polyaluminum chloride or ferric chloride) in various types of application and different industrial sectors.

| Application/ Industrial Sector | Dose (ppm) | Dose reduction (%) |
|---|---|---|
| Car Manufacture | 4-2 | 25-17 |
| Oil Refinery | 33-26 | 42-34 |
| Dairy products | 28-20 | 64-48 |
| Cooked foods | 20-12 | 37-32 |
| Chicken Slaughterhouse | 35-25 | 41-26 |
| Biodiesel generation | 25-10 | 21-05 |
| Ceramics | 3-1 | 12-6 |
| Oils | 20-10 | 33-16 |
| Foods | 30-25 | 62-32 |
| Ceramic Glazes | 8-6 | 25-12 |

As a result of these coagulation efficiency tests, by carrying out industrial trials, it has been observed that the new coagulating agent of the invention decreases the flocculant dose, compared to standard inorganic coagulants, like polyaluminum chloride or ferric chloride, during the physico-chemical treatment of industrial wastewater.

Example 10. Comparative Example of Biogas Production Between Sludge Generated with Standard Coagulants (Ferric Chloride) and with the Coagulating Agent of the Present Invention in Urban Wastewater Treatment The dosage of the new natural product developed during the physico-chemical treatment of urban wastewater allows increasing biogas production derived from generated sludge management. This is based on two differentiating characteristics with respect to inorganic salts like ferric chloride i) the new natural product developed has a lower density, therefore improvements in the mixing process are foreseen and ii) the new natural product developed comes from a biodegradable polymer and, therefore, increases the organic load in the anaerobic digestion process. Thus, it has been experimentally observed that During the dosing of the new natural product developed, the average biogas production was 625 $Nm^3$/day.

During the dosage of ferric chloride, the average biogas production was 374 $Nm^3$/day.

| Application | Average biogas production ($Nm^3$/day) | Production increase (%) |
|---|---|---|
| Urban wastewater | 625 | 67 |

Finally, it is concluded that the dosage of the new natural product developed allows increasing biogas production by 251 $Nm^3$/day.

Example 11. Comparative Example of Sludge Volume Generated Between Standard Coagulants (Inorganic Salts) and the Coagulating Agent of the Present Invention Regarding the coagulating nature of the new natural product developed, various industrial trials have been carried out to experimentally determine the sludge volume generated when using inorganic coagulants like polyaluminum chloride or ferric chloride against the new coagulating agent of the invention.

In the following table the range of sludge volume generated (%) and the percentage reduction obtained (%) for an optimal physical-chemical treatment of various products is detailed (comparing the new coagulating agent of the invention with standard inorganic coagulants, like polyaluminum chloride or ferric chloride) in various types of application and different industrial sectors.

| Application/ Industrial Sector | Sludge volume (%) | Volume reduction (%) |
|---|---|---|
| Car Manufacture | 20-35 | 40-55 |
| Oil Refinery | 10-25 | 65-88 |
| Dairy products | 15-28 | 48-62 |
| Cooked foods | 25-42 | 45-62 |
| Chicken Slaughterhouse | 45-62 | 41-55 |
| Biodiesel generation | 35-48 | 30-43 |
| Ceramics | 15-30 | 65-78 |
| Oils | 41-65 | 48-62 |
| Foods | 28-44 | 41-54 |
| Ceramic Glazes | 24-38 | 46-60 |
| Urban wastewater | 15-32 | 40-44 |

As a result of these coagulation efficiency tests, by carrying out industrial trials, it has been observed that the new coagulating agent of the invention dramatically decreases the volume of sludge generated, reporting important advantages from environmental and economic point of view (sludge management).

The invention claimed is:

1. A coagulating agent characterised by a metal-free content and an active material content of 28 to 32% by weight obtained from the polymerisation of an *Acacia mearnsii* extract, an amino compound and an aldehyde, wherein the addition of *Acacia mearnsii* extract over the dilution of the amino compound in water is carried out until an *Acacia mearnsii* extract:amino compound weight ratio that ranges between 3:1 and 2.5:1 is achieved, and where the addition of aldehyde is carried out until an aldehyde:initial amino compound weight ratio that ranges between 1.5:1 and 1:1 is reached, characterized in that the coagulating agent is obtained following the next stages:

(i) dilution of an amino compound in water at a temperature that ranges between 20° C. and 30° C.;

(ii) addition of *Acacia mearnsii* extract until an *Acacia mearnsii* extract:amino compound weight ratio ranges between 3:1 and 2.5:1;

(iii) heating of the mixture from stage (ii) to a temperature that ranges between 2° and 40° C.;

(iv) addition of aldehyde until an aldehyde:initial amino compound weight ratio that ranges between 1.5:1 and 1:1 is achieved;

(v) stirring of the mixture from stage (iv) at a temperature that ranges between 4° and 50° C. for a period of between 30 and 60 minutes;

(vi) adjustment of the pH of the previous mixture to values that ranges between 1.5 and 1.7;

(vii) stirring of the mixture from stage (vi) at a temperature that ranges between 45 and 55° C. for a period of between 50 and 70 minutes; and (viii) cooling of the mixture from stage (vii) to a temperature of 25 to 40° C.;

wherein the amino compound is selected from monoethanolamine, methylamine, and dimethylamine, or combinations thereof, and the aldehyde is selected from formaldehyde and acetaldehyde.

2. The coagulating agent according to claim 1 wherein the amino compound is monoethanolamine.

3. The coagulating agent according to claim 1, wherein the aldehyde is formaldehyde.

4. A method of obtaining the coagulating agent according to claim 1, which comprises the following stages:

(i) dilution of an amino compound in water at a temperature that ranges between 20° C. and 30° C.;

(ii) addition of *Acacia mearnsii* extract to an *Acacia mearnsii* extract:amino compound ratio that ranges between 3:1 and 2.5:1;

(iii) heating of the mixture from stage (ii) to a temperature that ranges between 2° and 40° C.;

(iv) addition of aldehyde until an aldehyde:initial amino compound ratio that ranges between 1.5:1 and 1:1 is achieved;

(v) stirring of the mixture from stage (iv) at a temperature that ranges between 4° and 50° C. for a period of between 30 and 60 minutes;

(vi) adjustment of the pH of the previous mixture to values that ranges between 1.5 and 1.7;

(vii) stirring of the mixture from stage (vi) at a temperature that ranges between 45 and 55° C. for a period of between 50 and 70 minutes, and (viii) cooling of the mixture from stage (vii) to a temperature of 25 to 40° C.;

wherein the amino compound is selected from monoethanolamine, methylamine, and dimethylamine, or combinations thereof; and the aldehyde is selected from formaldehyde and acetaldehyde.

5. The method according to claim 4, wherein the amino compound is monoethanolamine.

6. The method according to claim 4, wherein the aldehyde is formaldehyde.

7. A wastewater treatment method involving the addition of the coagulating agent according to claim 1, with a pH between 4 and 10.

8. The method according to claim 7, wherein the origin of the wastewater can be of urban, agrifood, textile, cardboard, automotive, construction, recycling management, chemical, petrochemical, and pharmaceutical industries.

9. The method according to claim 7, wherein the wastewater has an oil and hydrocarbon content in excess of 1,500 ppm.

* * * * *